United States Patent
Zebian

(10) Patent No.: US 11,791,480 B2
(45) Date of Patent: Oct. 17, 2023

(54) AIRCRAFT WITH A FUEL CELL AND A STRUCTURE HAVING A TANK CONTAINING A HEAT-TRANSFER FLUID ENSURING THE COOLING OF THE FUEL CELL

(71) Applicant: Airbus Operations SAS, Toulouse (FR)

(72) Inventor: Maxime Zebian, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 17/574,917

(22) Filed: Jan. 13, 2022

(65) Prior Publication Data

US 2022/0231311 A1 Jul. 21, 2022

(30) Foreign Application Priority Data

Jan. 18, 2021 (FR) ...................................... 2100433

(51) Int. Cl.
*H01M 8/04007* (2016.01)
*B64C 1/06* (2006.01)
*B64C 3/34* (2006.01)
*B64D 41/00* (2006.01)

(52) U.S. Cl.
CPC ......... *H01M 8/04059* (2013.01); *B64C 1/061* (2013.01); *B64C 3/34* (2013.01); *B64D 2041/005* (2013.01); *H01M 2250/20* (2013.01)

(58) Field of Classification Search
CPC .......... H01M 8/04029; H01M 8/04059; B64D 2041/005
See application file for complete search history.

(56) References Cited

U.S. PATENT DOCUMENTS

| | | |
|---|---|---|
| 2007/0158500 A1 | 7/2007 | Sridhar et al. |
| 2011/0031353 A1 | 2/2011 | Stolte et al. |
| 2013/0199218 A1 | 8/2013 | Scheibert |
| 2013/0260273 A1* | 10/2013 | Scheibert .......... H01M 8/04059 429/437 |

FOREIGN PATENT DOCUMENTS

| | | |
|---|---|---|
| DE | 102007060428 B3 | 5/2009 |
| WO | 2009127652 A2 | 10/2009 |

OTHER PUBLICATIONS

French Search Report; priority document.

* cited by examiner

*Primary Examiner* — Brittany L Raymond
(74) *Attorney, Agent, or Firm* — Greer, Burns & Crain, Ltd.

(57) ABSTRACT

An aircraft comprising a structure comprising a leakproof tank delimited by walls, of which at least one is in contact with the air outside the aircraft, and filled partly with a two-phase heat-transfer fluid, a fuel cell that is passed through by a heat-transfer fluid, and a line which takes the heat-transfer fluid at an output of the fuel cell and which reintroduces this heat-transfer fluid at an input of the fuel cell. The line passes through the leakproof tank immersed in the heat-transfer fluid in liquid phase.

7 Claims, 2 Drawing Sheets

AIRCRAFT WITH A FUEL CELL AND A STRUCTURE HAVING A TANK CONTAINING A HEAT-TRANSFER FLUID ENSURING THE COOLING OF THE FUEL CELL

CROSS-REFERENCES TO RELATED APPLICATIONS

This application claims the benefit of the French patent application No. 2100433 filed on Jan. 18, 2021, the entire disclosures of which are incorporated herein by way of reference.

FIELD OF THE INVENTION

The present invention relates to an aircraft comprising at least one fuel cell and a structure having a tank allowing the storage of a two-phase heat-transfer fluid ensuring the cooling of said fuel cell.

BACKGROUND OF THE INVENTION

In order to reduce the fuel consumption of an aircraft, it is known practice to use fuel cells, in which each generates an electrical current used to power an electric motor turning one or more propellers.

The fuel cell makes it possible to convert chemical energy deriving from an oxidoreduction reaction of dihydrogen and of dioxygen into electrical energy, into heat and into water.

In order to control the temperature of the fuel cell, such an installation comprises a cooling system.

FIG. 4 is a schematic representation of such an installation 400 in an aircraft, which comprises a fuel cell 402, and a cooling system 404 which comprises a line 406 which takes a heat-transfer fluid at an output of the fuel cell 402 and which introduces this heat-transfer fluid at an input of the fuel cell 402.

The cooling system 404 also comprises a pumping system comprising at least one pump 408 which is arranged on the line 406 to drive the heat-transfer fluid in the line 406 between the output and the input of the fuel cell 402.

The cooling system 404 also comprises a heat exchanger 410 which is arranged on the line 406 and which ensures the transfer of calories from the heat-transfer fluid to a cold fluid, conventionally the air outside the aircraft. Thus, the outside air passes through the heat exchanger 410 then is rejected outside. At the same time, the heat-transfer fluid passes through the heat exchanger 410 and the calories of the heat-transfer fluid are transferred to the outside air.

Because of the large quantity of calories to be discharged, the heat exchanger 410 has a relatively large size, which is detrimental in terms of weight and of drag.

It is therefore desirable to find an installation which makes it possible to discharge the calories while having smaller dimensions.

SUMMARY OF THE INVENTION

One object of the present invention is to propose an aircraft comprising at least one fuel cell and a structure having a tank allowing the storage of a two-phase heat-transfer fluid ensuring the cooling of said fuel cell.

To this end, an aircraft is proposed comprising:
a structure comprising a leakproof tank delimited by walls, of which at least one is in contact with the air outside the aircraft, and filled partly with a first, two-phase heat-transfer fluid,
a fuel cell that is passed through by a second heat-transfer fluid, and
at least one line which takes the second heat-transfer fluid at an output of the fuel cell, and which reintroduces this second heat-transfer fluid at an input of the fuel cell, in which the line passes through the leakproof tank immersed in the first heat-transfer fluid in liquid phase.

Thus, the use of a first, two-phase heat-transfer fluid allows for a better transfer of the calories from the second heat-transfer fluid to the first heat-transfer fluid and the storage of the first heat-transfer fluid in a tank of the structure of the aircraft in contact with the outside air ensures the cooling of the first heat-transfer fluid at lower cost in terms of bulk and drag.

Advantageously, the structure comprises a fuselage with an inner wall and an outer wall, and the leakproof tank is delimited between the inner wall and the outer wall.

Advantageously, the structure comprises at least one wing with a lower surface wall and an upper surface wall, and the leakproof tank is delimited between the lower surface wall and the upper surface wall.

Advantageously, the first heat-transfer fluid is water.

Advantageously, the line is divided into a plurality of sublines in the leakproof tank.

Advantageously, the aircraft comprises a heat exchanger arranged on the line and ensuring the transfer of calories from the second heat-transfer fluid to the outside air.

Advantageously, the aircraft comprises an overpressure system arranged at the leakproof tank.

BRIEF DESCRIPTION OF THE DRAWINGS

The features of the invention mentioned above, and others, will become more clearly apparent on reading the following description of an exemplary embodiment, said description being given in relation to the attached drawings, in which.

DETAILED DESCRIPTION OF THE PREFERRED EMBODIMENTS

Figure 1:
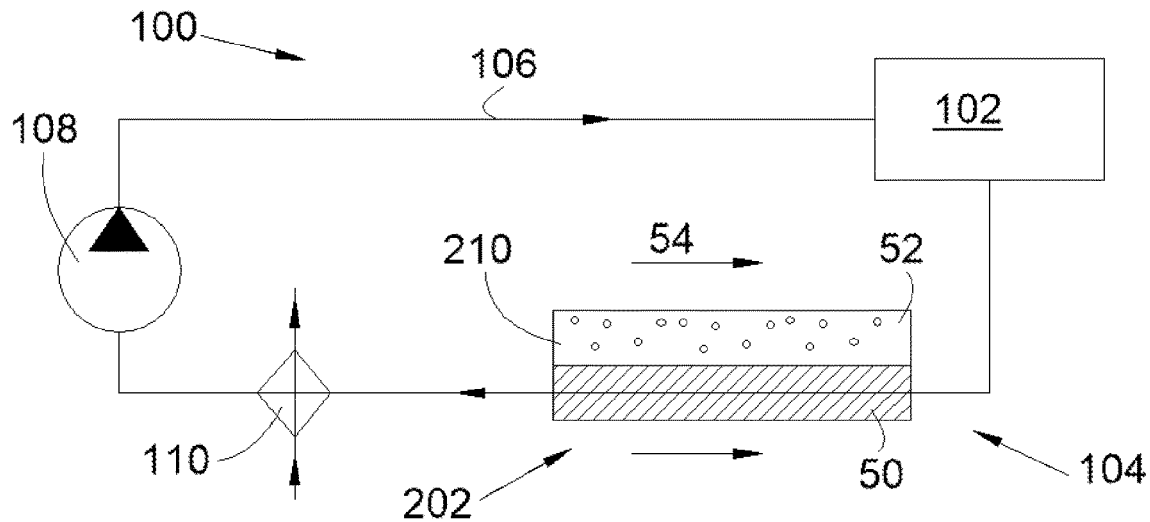
FIG. 1 is a schematic representation of an installation implemented in an aircraft according to the invention.
Figure 2:
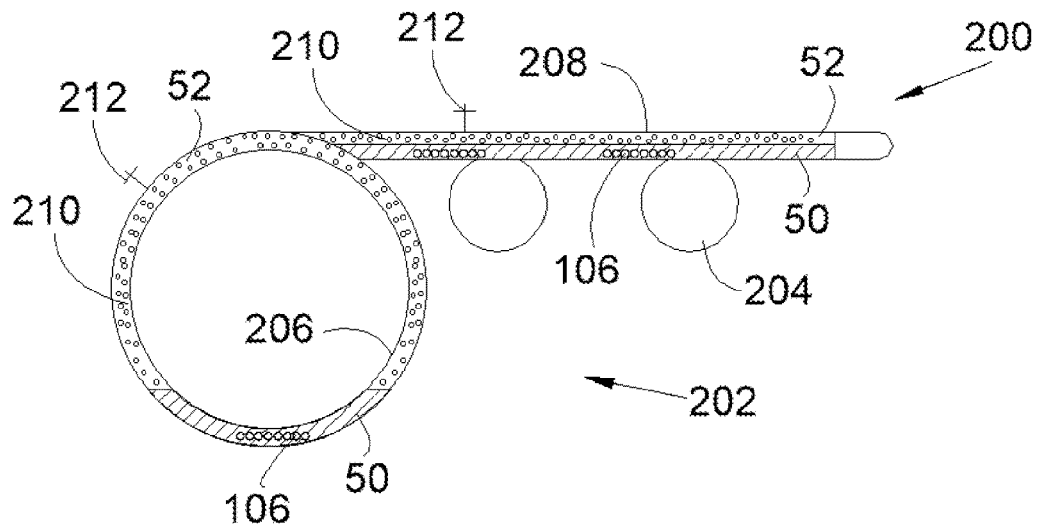
FIG. 2 is a schematic representation in cross section through a front-end plane of an aircraft according to the invention.

FIG. 1 is a schematic representation of an installation 100 implemented in an aircraft according to the invention and represented schematically in FIG. 2.

The installation 100 comprises a fuel cell 102 which converts the chemical energy deriving from an oxidoreduction of dihydrogen and of dioxygen into electrical energy, into heat and into water. To this end, the aircraft 200 comprises a tank of dihydrogen and a line circuit ensuring that the fuel cell 102 is supplied with the dihydrogen. Likewise, the fuel cell 102 is supplied with dioxygen, either from a tank of dioxygen of the aircraft 200, or by the outside air. Such an architecture is conventional and is not described further.

FIG. 2 is a schematic representation of the aircraft 200 which comprises a structure 202 and engines 204.

The structure 202 conventionally comprises a fuselage 206 and a wing 208 on either side of the fuselage 206. The aircraft 200 here comprises two engines 204 under each wing 208. Obviously, the aircraft can comprise just one or more than two engines 204 under each wing 208. The fuel cells 102 electrically power the engines 204 which are, for example, propeller engines.

In order to control the temperature of the fuel cell 102, the latter is passed through by a heat-transfer fluid, called second heat-transfer fluid. The second heat-transfer fluid is generally in liquid phase. The second heat-transfer fluid can also be a two-phase heat-transfer fluid having a gaseous phase and a liquid phase. The second heat-transfer fluid can be water, or a mixture of water and additives, such as glycol water. The installation 100 also comprises a cooling system 104 which ensures the cooling of the second heat-transfer fluid.

The cooling system 104 comprises at least one line 106 which takes the second heat-transfer fluid at an output of the fuel cell 102 and which reintroduces this second heat-transfer fluid at an input of the fuel cell 102. The line 106 and the fuel cell 102 thus form a closed loop of circulation of the second heat-transfer fluid.

The cooling system 104 also comprises a pumping system comprising at least one pump 108 which is arranged on the line 106 to drive the second heat-transfer fluid in the line 106 between the output and the input of the fuel cell 102.

The structure 202 comprises at least one leakproof tank 210.

The leakproof tank 210 can be a part of the wing 208 and/or a part of the fuselage 206. For example, if the fuel cell 102 is in the engine 204 on the wing 208, it is preferable to provide the leakproof tank 210 in the wing 208, and if the fuel cell 102 is in the fuselage 206, it is preferable to provide the leakproof tank 210 in the fuselage 206 to reduce the length of the line 106. However, other layouts are possible.

The leakproof tank 210 is delimited by walls of the aircraft 200 of which at least one is in contact with the air outside the aircraft 200. In the case where the leakproof tank 210 is in the wing 208, the leakproof tank 210 is delimited between the lower surface wall and the upper surface wall of the wing 208, and the two walls are in contact with the outside air. In the case where the leakproof tank 210 is in the fuselage 206 which has an inner wall and an outer wall, the leakproof tank 210 is delimited between the inner wall and the outer wall which is the wall in contact with the outside air.

The leakproof tank 210 is filled partly with a heat-transfer fluid, called first heat-transfer fluid, which has two phases, namely a liquid phase 50 and a gaseous phase 52, within the temperature ranges considered, that is to say, according to the temperature of the heat-transfer fluid coming from the fuel cell 102. The leakproof tank 210 forms a closed loop of circulation of the first heat-transfer fluid.

The first heat-transfer fluid is distinct from the second heat-transfer fluid.

According to a preferred embodiment, the first heat-transfer fluid is water which all evaporates at approximately 100° C. at ground level (in conventional atmospheric conditions) and at approximately 75° C. at an altitude of 25,000 feet. Because of this, it is possible to cool this first heat-transfer fluid to a lower temperature at altitude than at ground level. The first heat-transfer fluid can also be a mixture of water and of additives, such as glycol water.

The line 106 passes through the leakproof tank 210 at a height where the line 106 is immersed in the first heat-transfer fluid in liquid phase 50, that is to say more in the lower part of the leakproof tank 210.

Thus, when the second heat-transfer fluid coming from the output of the fuel cell 102 passes through the leakproof tank 210, the first heat-transfer fluid which surrounds the line 106 picks up the calories from the second heat-transfer fluid and evaporates, then, in contact with the wall in contact with the outside air, the vapor thus given off condenses to drop back into the liquid phase 50. The outside air (arrows 54 along the lower surface and the upper surface) cools the wall of the leakproof tank 210 and thus makes it possible to lower the temperature of the first heat-transfer fluid and condense it. Since the first heat-transfer fluid reverts to its liquid state, and the first heat-transfer fluid considered has a significant latent heat, there is no need to install a very significant volume and mass of said first heat-transfer fluid.

The second heat-transfer fluid can be in liquid phase and/or in gaseous phase in the line 106 between the output of the fuel cell 102 and the leakproof tank 210, and in liquid phase in the line 106 between the leakproof tank 210 and the input of the fuel cell 102.

The quantity of calories thus discharged is then relatively great without it being necessary to put in place one or more imposing heat exchangers in terms of weight and drag.

To enhance the transfer of calories, the line 106 can be divided into a plurality of sublines in the leakproof tank 210 as is represented in FIG. 2.

Figure 3:
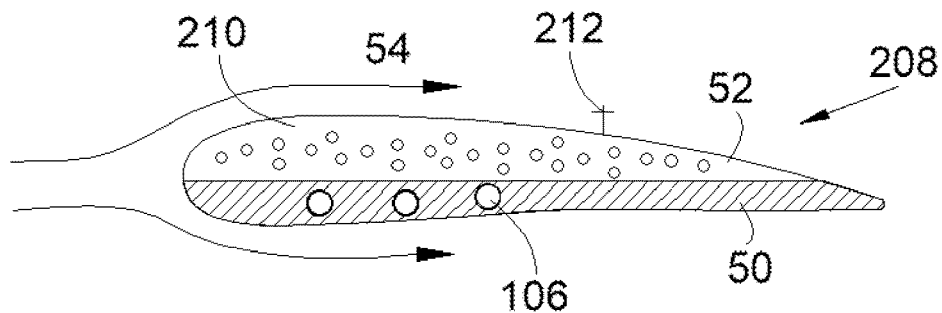
FIG. 3 is a side and cross-sectional view of a wing of an aircraft according to the invention.
Figure 4:
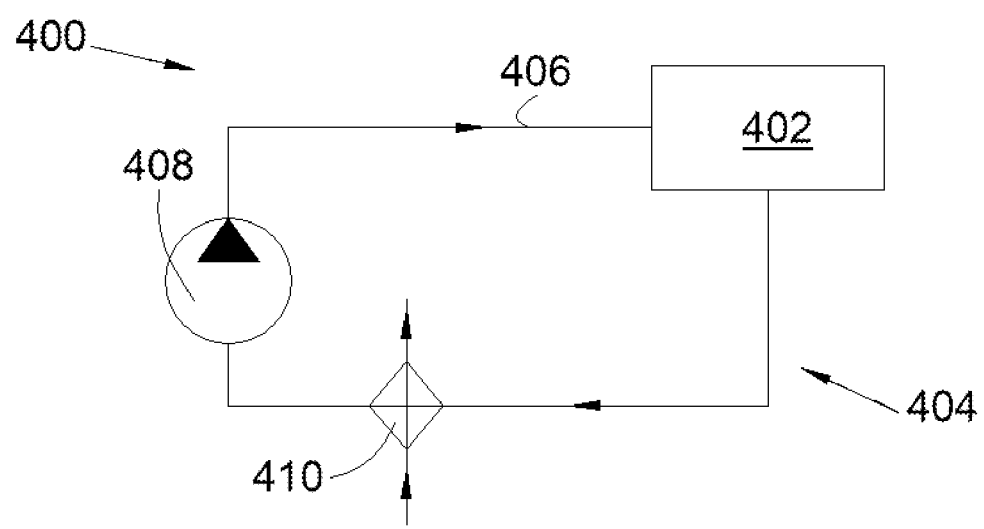
FIG. 4 is a schematic representation of an installation of the state of the art.

FIG. 3 shows the wing 208 with the plurality of sublines immersed in the first heat-transfer fluid in liquid phase 50.

In the case where the discharge of the calories by the first heat-transfer fluid would not be sufficient, it is possible to arrange one or more heat exchangers 110 on the line 106. Depending on the surface of the tank in contact with the outside air, this heat exchanger 110 can be of very much smaller size than that of the state of the art, because it serves only to discharge a small part of the calories. This heat exchanger 110 ensures the transfer of calories from the heat-transfer fluid to a cold fluid, for example the air outside the aircraft 200. Thus, the outside air passes through the heat exchanger 110 then is rejected outside. At the same time, the second heat-transfer fluid passes through the heat exchanger 110 and the calories from the second heat-transfer fluid are transferred to the outside air. This heat exchanger 110 is preferentially installed downstream of the leakproof tank 210 with respect to the direction of flow of the second heat-transfer fluid. Obviously, this heat exchanger 110 can be installed upstream of the leakproof tank 210 with respect to the direction of flow of the heat-transfer fluid.

An overpressure system comprising at least one valve 212 can be provided at the leakproof tank 210 in order to release the pressure if the latter becomes too great.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
   a structure comprising a leakproof tank delimited by walls of which at least one is in contact with air outside the aircraft, and filled partly with a first, two-phase heat-transfer fluid,
   a fuel cell passed through by a second heat-transfer fluid, and
   at least one line which takes the second heat-transfer fluid at an output of the fuel cell and which reintroduces this second heat-transfer fluid at an input of the fuel cell,
   wherein the line passes through the leakproof tank, the line being immersed in the first, two-phase heat-transfer fluid in liquid phase.

2. The aircraft according to claim 1,
   wherein the structure comprises a fuselage with an inner wall and an outer wall, and
   wherein the leakproof tank is delimited between the inner wall and the outer wall.

3. The aircraft according to claim 1, wherein the structure comprises at least one wing with a lower surface wall and an upper surface wall, and
   wherein the leakproof tank is delimited between the lower surface wall and the upper surface wall.

4. The aircraft according to claim 1, wherein the first, two-phase heat-transfer fluid is water.

5. The aircraft according to claim 1, wherein the line is divided into a plurality of sublines in the leakproof tank.

6. The aircraft according to claim 1, wherein the aircraft comprises a heat exchanger arranged on the line and ensuring a transfer of calories from the second heat-transfer fluid to the air outside of the aircraft.

7. The aircraft according to claim 1, wherein the aircraft comprises an overpressure system arranged at the leakproof tank.

* * * * *